July 29, 1930.  D. F. McGOVERN  1,771,804
QUICK DETACHABLE CONNECTION FOR WORK WHEELS
Filed June 29, 1926
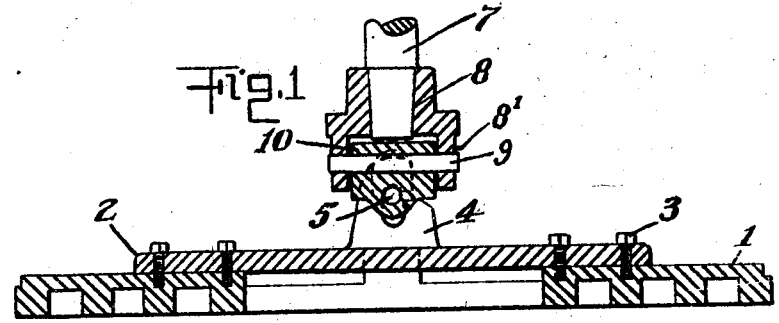
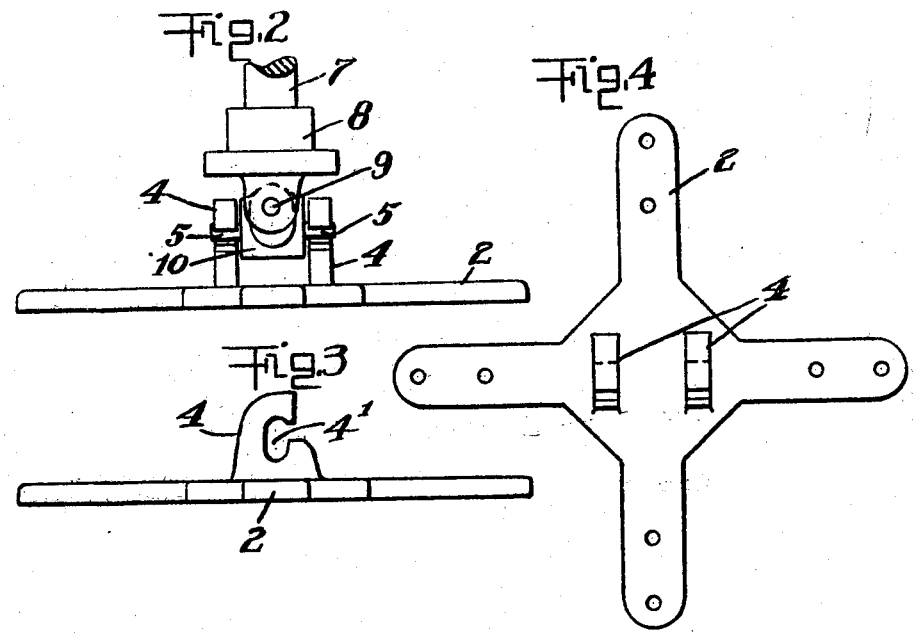
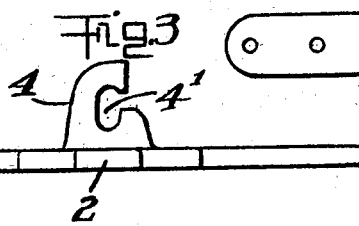
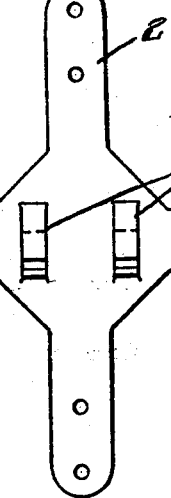
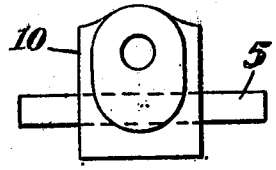
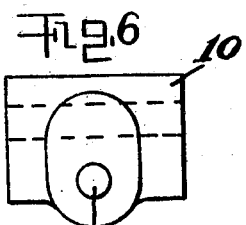
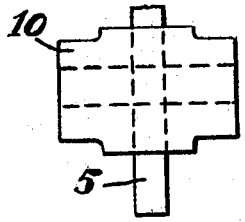
Inventor
Daniel F. McGovern
By
Attorney Patented July 29, 1930

1,771,804

UNITED STATES PATENT OFFICE

DANIEL FREDRICK McGOVERN, OF MONTPELIER, VERMONT

QUICK DETACHABLE CONNECTION FOR WORK WHEELS

Application filed June 29, 1926. Serial No. 119,336.

This invention involves a quickly detachable driving connection between the work wheel and the driving spindle of a stone polishing machine.

Ordinarily, the top face of the work wheel is provided with a pair of spaced upstanding lugs by means of which the wheel is bolted to a similar pair of lugs depending from the universal joint at the lower end of the driving spindle.

In mounting such a wheel, the spindle is moved relative to the wheel to bring the bolt holes of the lug pairs in registration with each other. This is difficult. The universal joint seems to have a tendency to twist away from the operative just at the moment that the bolt holes of the lug pairs are registered with each other. Frequently the bolt has become bent or its nut has become rust-bound. The operation of changing a wheel, therefore, sometimes takes as long as a half hour, and at best is slow and tedious and inconvenient.

To the end, therefore, of providing a driving connection between work wheel and spindle which may be conveniently and quickly connected and disconnected, I have devised my present invention.

According to it, I rigidly attach to the upper face of the work wheel a driver plate which is provided with a pair of spaced upstanding lugs having laterally-opening slots adapted to receive the projecting ends of one of the universal joint pins at the lower end of the driving spindle. This permits me quickly and easily to connect the work wheel and spindle by simply moving the spindle relative to the wheel until the cross pin of the universal joint enters the slotted lugs of the driver. The slots of said lugs are so designed as to prevent accidental withdrawal of the pin therefrom during the run of the wheel while conveniently permitting intentional attachment and detachment.

The construction and operation of my driver is described and illustrated in the accompanying specification and drawings, and the characteristic features of novelty are particularly pointed out in the appended claims.

In the drawings:

Fig. 1 is a section of a work wheel and driving spindle equipped with a quickly detachable driving connection in accordance with my invention.

Fig. 2 is an elevation at right angles to Fig. 1.

Fig. 3 is a side view of the driver plate, removed.

Fig. 4 is a plan view thereof, and

Figs. 5, 6 and 7 are details of the universal joint.

I have indicated at 1 a work wheel of standard type. As here shown, such wheel is an emery ring, but the principles of my invention apply to other wheels, as polishing wheels and buffers, and the term "work wheel" is to be understood as inclusive thereof.

Fastened to the upper face of the wheel is a driver plate 2, which preferably is cruciform in plan, as appears in Fig. 4. The fastenings 3 which attach the plate to the wheel are here shown as bolts.

Projecting upwardly from the top face of the driver plate 2 adjacent the center thereof is a pair of spaced lugs 4 having laterally opening bayonet slots 4' adapted to receive the projecting ends of the lowermost cross pin 5 of the universal joint 10 which is mounted at the lower end of the driving spindle 7.

As here shown, the spindle has a collar 8 fast thereon at its lower end, and said collar is bifurcated to provide a pair of depending ears 8' through which the upper cross pin 9 of the universal joint is set.

In use, the spindle 7 is moved relative to the wheel until the projecting ends of the cross pin 5 are laterally entered into the slots 4' of the driver lugs. These slots are so designed as to prevent accidental withdrawal of the pin therefrom during the run of the wheel, but are sufficiently deep to permit a slight vertical play between the spindle and work wheel.

Various modifications in structural details may obviously be resorted to within the limits of the appended claims.

What I therefore claim and desire to secure by Letters Patent is:

1. In combination, a rotatable work element, a rotatable driving element therefor, and interfitting formations on said elements engageable with one another while said elements are disposed with their axes extending in the same direction and solely by lateral and subsequent axial movement of said elements relative to one another, to establish a driving connection between said elements positively preventing their rotation relative to one another.

2. In combination, a rotatable work element, a rotatable driving element therefor, one of said elements having an axially extending slot provided with an entrance portion opening laterally through the side thereof, and a pin on the other element engageable in and disengageable from said slot through the entrance portion thereof by relative lateral movement between said elements, said elements being axially movable with respect to one another when same are disposed with their axes extending in the same direction and with said pin engaged in the axially extending portion of said slot, and said pin when engaged in the axially extending portion of said slot extending transversely across same and cooperating therewith to prevent relative rotation between said elements.

3. In combination, a rotatable work element, a rotatable driving element therefor, one of said elements having a slot provided with an entrance portion opening through the side thereof, said slot extending from said entrance portion in the direction of the axis of the element and in both directions relative to said entrance portion, and a pin carried by the other of said elements and extending laterally with respect thereto for engagement in said slot, said elements being axially movable relative to one another to enable said pin to be seated in either end of the axially extending portion of said slot when said elements are disposed with their axes extending in the same direction and with said pin engaged in said slot.

4. In combination, a rotatable work element, a pair of lugs projecting from said element, said lugs each having a slot provided with an entrance portion opening through the side thereof, each slot extending from its entrance portion in the direction of the axis of the element, a rotatable driving element for said work element inclusive of a portion adapted to be received between said lugs, and pins projecting laterally from said driving element for engagement in the slots of said lugs to establish a driving connection between said elements, said elements being axially movable relative to one another when said elements are disposed with their axes extending in the same direction and with said pins engaged in said slots.

In testimony whereof I affix my signature.

DANIEL FREDRICK McGOVERN.